(No Model.) 3 Sheets—Sheet 1.
G. W. SHEM.
VALVE FOR HIGH PRESSURES.

No. 583,822. Patented June 1, 1897.

Witnesses:
Charles De Cou.
F. E. Bechtold.

Inventor
George W. Shem,
by his Attorneys,
Howson & Howson (No Model.) 3 Sheets—Sheet 2.

G. W. SHEM.
VALVE FOR HIGH PRESSURES.

No. 583,822. Patented June 1, 1897.

Witnesses:
Charles De Cow,
F. E. Bechtold.

Inventor:
George W. Shem,
by his Attorneys,
Howson & Howson (No Model.)  3 Sheets—Sheet 3.

G. W. SHEM.
VALVE FOR HIGH PRESSURES.

No. 583,822.  Patented June 1, 1897.

Witnesses:
Charles De Cou
F. E. Bechtold

Inventor:
George W. Shem,
by his Attorneys,
Howson & Howson

UNITED STATES PATENT OFFICE.

GEORGE W. SHEM, OF CAMDEN, NEW JERSEY, ASSIGNOR TO THE CAMDEN IRON WORKS, OF SAME PLACE.

VALVE FOR HIGH PRESSURES.

SPECIFICATION forming part of Letters Patent No. 583,822, dated June 1, 1897.

Application filed December 4, 1896. Serial No. 614,516. (No model.)

*To all whom it may concern:*

Be it known that I, GEORGE W. SHEM, a citizen of the United States, and a resident of Camden, New Jersey, have invented certain Improvements in Valves for High Pressures, of which the following is a specification.

My invention relates to that class of valves which are employed for governing the flow of fluid under heavy pressure, one object of my invention being to construct for such purpose a very compact and efficient four-way valve—that is to say, a valve which will direct the fluid under pressure from a supply-pipe to either of two cylinders or other pressure-employing devices and will exhaust or discharge fluid from one cylinder when it is being admitted to the other cylinder. The valve is also constructed so as to cut off the flow of fluid to both cylinders when desired.

A further object of the invention is to so construct the valve that but a small number of packing-rings are needed in the same and to increase the durability of such rings by preventing them from being cut or mutilated as they are carried while under pressure over or across openings in the valve structure.

These objects I attain in the manner hereinafter set forth, reference being had to the accompanying drawings, in which—

Figure 1:
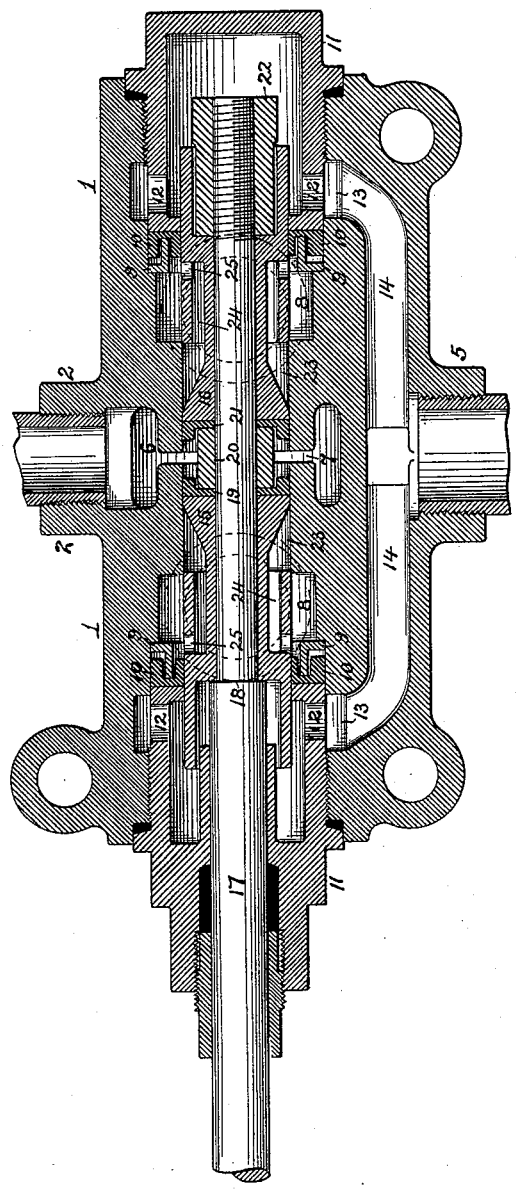
Figure 2:
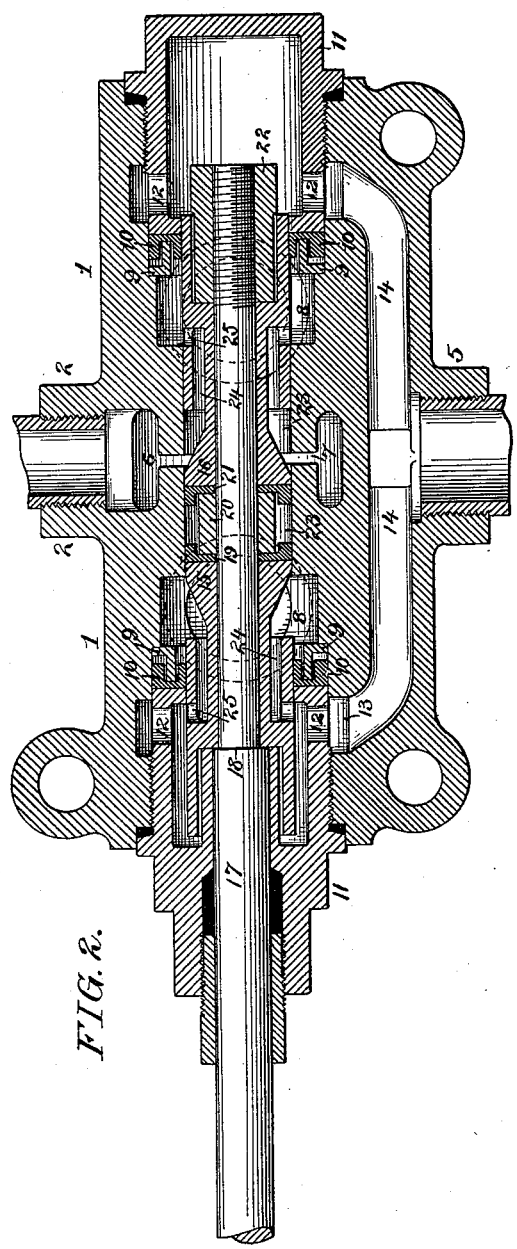
Figure 3:
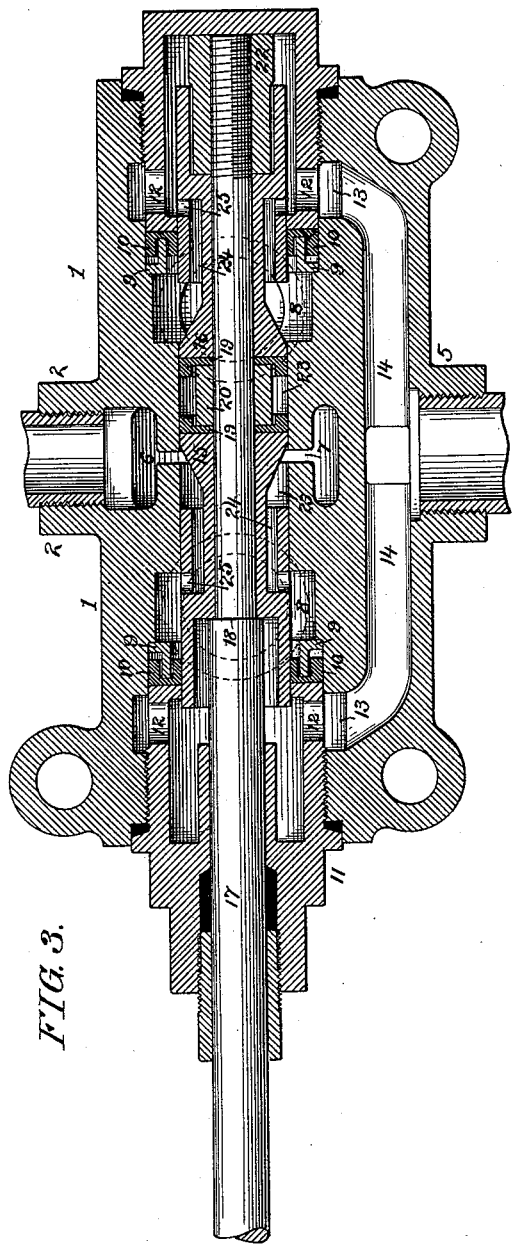
Figure 4:
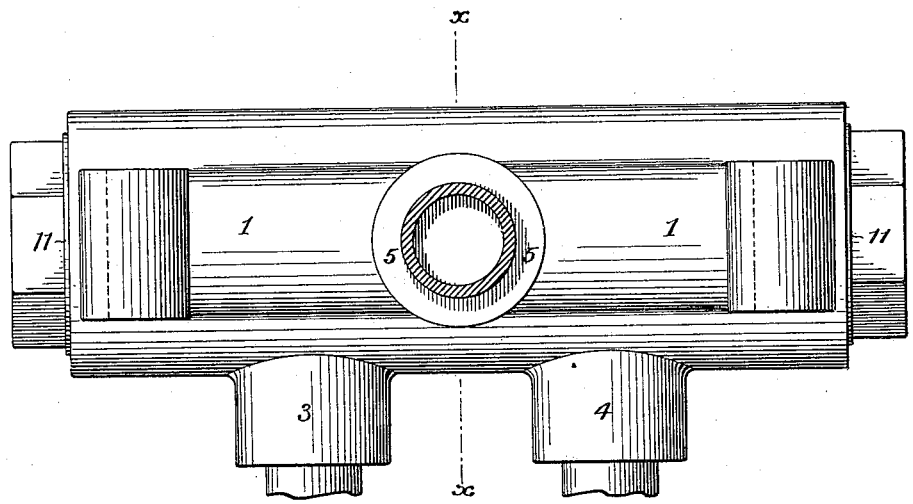
Figure 5:
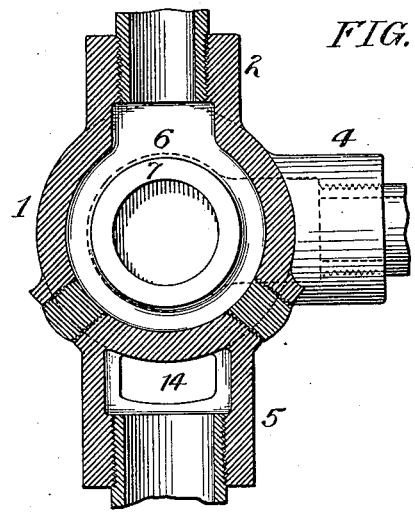

Figure 1 is a longitudinal sectional view of a fluid-pressure valve constructed in accordance with my invention. Figs. 2 and 3 are similar views showing adjustments of the valve different from that represented in Fig. 1. Fig. 4 is an inverted or bottom view of the valve; and Fig. 5 is a transverse section of the valve on the line *x x*, Fig. 4.

The casing or chest 1 of the valve has four branches numbered, respectively, 2, 3, 4, and 5, the branch 2 communicating with a supply-pipe which is connected to any convenient reservoir of fluid under pressure, the branch 5 being provided with a suitable discharge-pipe and the branches 3 and 4 being connected to hydraulic cylinders or other structures in which the fluid under pressure is to be utilized, these structures being hereinafter, for convenience, referred to simply as "cylinders."

The pressure-supply pipe communicates with an annular chamber 6 in the valve-chest, this chamber being in communication with the central portion of the bore of the chest through an annular slot 7 or a series of ports. The bore of the chest is enlarged at each end, so as to form chambers 8, communicating, respectively, with the branches 3 and 4 of said chest, beyond which chambers the bore is still further enlarged slightly, so as to form seats for L-shaped rings 9, which serve to confine packing-rings 10 against the inner ends of plugs 11, screwed into the opposite ends of the chest 1 or otherwise permanently retained in position therein. These plugs 11 have ports 12 communicating with annular chambers 13, one near each end of the chest 1, these chambers 13 being connected together by a longitudinal passage 14, which also communicates with the exhaust branch 5 of the valve-chest.

The valve piston or plunger comprises a pair of sleeves 15 and 16, which are similar to each other and are slipped onto the inner end of the valve-spindle 17, the outer portion of the sleeve 15 having a bearing against a shoulder 18 on said spindle. Against the inner end of the sleeve 15 bears a packing-ring 19, which is maintained in contact therewith by means of a ring or collar 20, adapted to the reduced portion of the spindle 17, this ring or collar also bearing against a packing-ring 21 at the inner end of the sleeve 16, and against the outer portion of said sleeve 16 bears a nut 22, which is adapted to a thread cut upon the end of the valve-spindle.

In each of the valve-sleeves 15 and 16 is formed an external channel 23, communicating through an annular passage 24 with ports 25 some distance from said channel 23, so that when the valve-spindle is moved to the position shown in Fig. 2 the channel 23 of the sleeve 16 will be in communication with the supply-pipe through the annular slot 7 and chamber 6, and the ports 25 of said sleeve 16 will be in communication with the chamber 8 of the branch 4. Hence fluid under pressure will be directed to the cylinder communicating with said branch 4. At the same time the channel 23 of the sleeve 15 will be in communication with the chamber 8 of the branch 3, and the ports 25 of said sleeve 15 will be in communication through the ports 12 of one of the hollow plugs 11 with the chamber 13 at one end of the valve-casing. Hence fluid under pressure can be exhausted from the cylinder which is in communication with said branch 3. When, however, the valve-spindle is adjusted to the position shown in Fig. 3, the conditions are reversed, fluid under pressure being now directed to the cylinder communicating with the branch 3 and being exhausted from the cylinder communicating with the branch 4, as will be readily understood.

When the valve-spindle is adjusted to the intermediate position shown in Fig. 1, neither of the channels 23 is in communication with the slot 7 of the central supply-chamber 6. Hence both of the cylinders are cut off from the supply of fluid under pressure and also from the exhaust, the port 25 of the respective sleeves being inside of the packing-rings 10, so that flow of fluid under pressure from either chamber 8 to the exhaust-chamber is cut off. Means are thus provided for maintaining pressure in either cylinder or for admitting it to either while exhausting it from the other, these operations being effected by manipulation of a single valve-stem and with the use of but one pressure-supply pipe and one exhaust-pipe.

The packing-rings 10 are U-shaped in cross-section, the outer flange of each ring serving to pack the joint between the valve-chest and the plug 11, while the inner flange serves to pack the joint between said plug and the sliding valve-piston, the flange of the annular ring 9, which confines the packing-ring in place, being so much narrower than the space between the two flanges of the packing-ring that fluid under pressure can gain access to the back face of each flange. When the inner flange of either ring, therefore, crosses or projects over any of the spaces or openings in the valve-piston, the pressure on said flange is equalized. Hence there is no tendency to force the flange into the opening and thus cause cutting or mutilation of the flange as the valve-piston is shifted. The same is true of the packing-rings 19 and 21.

By making the valve-piston in the form of two sleeves which are counterparts of each other, and by slipping these sleeves onto the valve-spindle together with the interposed loose ring 20 for confining the packing-rings 19 and 21, the valve-plunger can be very cheaply made, while the combination of ports and passages which I have devised provides for the proper packing of all joints with but four packing-rings, a number much less than is usually required in valves of this character.

Having thus described my invention, I claim and desire to secure by Letters Patent—

The combination of the valve-chest having a central supply-chamber, distributing-chambers flanking the same, and exhaust-chambers beyond said distributing-chambers, and packing-rings interposed between said exhaust and distributing chambers with the valve-piston having a pair of centrally-disposed packing-rings and, on each side of the same, conveyer-passages comprising an external channel and external ports beyond the same but connected thereto, substantially as specified.

In testimony whereof I have signed my name to this specification in the presence of two subscribing witnesses.

GEORGE W. SHEM.

Witnesses:
JOS. H. KLEIN,
F. E. BECHTOLD.